United States Patent [19]
Cheng-Hung

[11] Patent Number: 5,565,155
[45] Date of Patent: Oct. 15, 1996

[54] METHOD OF MAKING A SAFETY HELMET

[76] Inventor: Lin Cheng-Hung, No. 13 Lane 40, Chingmei Rd, Taiping Hsiang Taichung Hsien, Taiwan

[21] Appl. No.: 530,932

[22] Filed: Sep. 19, 1995

[51] Int. Cl.6 .......................... B29C 44/06; B29C 44/12; B29C 44/14
[52] U.S. Cl. .......................... 264/46.5; 264/46.6; 264/338
[58] Field of Search .................. 264/46.5, 46.6, 264/338

[56] References Cited

U.S. PATENT DOCUMENTS

| | | | |
|---|---|---|---|
| 2,908,943 | 10/1959 | Miller | 264/46.6 |
| 3,935,044 | 1/1976 | Daly | 264/45.4 |
| 3,950,483 | 4/1976 | Spier | 264/46.4 |
| 4,288,268 | 9/1981 | Hartung | 264/219 |
| 4,298,556 | 11/1981 | Rutsch et al. | 264/46.7 |
| 4,473,208 | 9/1984 | Nava | 264/314 |
| 5,298,208 | 3/1994 | Sibley et al. | 264/45.4 |
| 5,324,460 | 6/1994 | Briggs | 264/45.2 |

*Primary Examiner*—Allan R. Kuhns
*Attorney, Agent, or Firm*—W. Wayne Liauh

[57] ABSTRACT

A method of making a safety helmet includes using a molding tool having an upper mold cavity and a lower mold cavity. The upper mold cavity is preheated and is then coated with a layer of releasing agent. The releasing agent layer is coated subsequently with a layer of polyurethane lacquer, which is caused by the residual heat of the preheated upper mold cavity to form a smooth film layer. A plastic shell of the safety helmet is disposed in the lower mold cavity. A foam material is injected into the plastic shell before the molding tool is closed. As the foaming process is completed, the molding tool is opened to remove therefrom a safety helmet including the shell, the foam layer formed of the foam material, and the smooth film layer which is formed integrally with the foam layer for providing the user of the safety helmet with wearing comfort.

7 Claims, 9 Drawing Sheets

FIG · 4

METHOD OF MAKING A SAFETY HELMET

FIELD OF THE INVENTION

The present invention relates generally to a method of making a safety helmet, and more particularly to a method of making a motorcycle safety helmet having a shell which is provided with a smooth inner side of a foam material and is made integrally with the edge shell thereof.

BACKGROUND OF THE INVENTION

Without wearing a safety helmet, a motorcyclist is rather vulnerable to head injury when an accident takes place. The safety-conscious bicyclists are also becoming aware of the importance of wearing a safety helmet. Generally speaking, a safety helmet is composed of a shell of a plastic material. The inner side of the shell of the safety helmet is furnished with a shock-absorbing layer Fastened thereto for providing a wearing comfort and protecting the head from an impact. The conventional methods of making a safety helmet are summed up hereinafter.

The conventional safety helmet is generally composed of a shell of a plastic material. The shell is provided on the inner side thereof with a layer of an expanded polystyrene material. The expanded polystyrene layer is provided with a soft layer of a cotton material for preventing the head from making contact with the expanded polystyrene layer. The method of making such a conventional safety helmet as described above is not cost-effective.

Another conventional safety helmet is composed of a shell of a plastic material. The shell is provided on the inner side thereof with a layer of a foam material. The foam material layer is formed integrally with the shell in a molding tool at a predetermined temperature and under a predetermined pressure. The foam material layer is intended to provide the shell of the helmet with a cushioning effect. However, in the process of making the helmet, the foam material layer is not attached securely to the surface of the upper mold cavity of the molding tool, thereby causing the foam material layer to have a rough surface which can cause a wearing discomfort and is therefore covered with a soft layer of a cotton material at an additional cost. The method of making this type of the safety helmet is also inefficient.

SUMMARY OF THE INVENTION

It is therefore the primary objective of the present invention to provide a method of making a safety helmet, which is capable of overcoming the drawbacks of the conventional methods of making a safety helmet.

The method of the present invention comprises a molding tool having an upper mold cavity which is preheated and is then coated with a layer of a releasing agent. The releasing agent layer is subsequently coated with a layer of polyurethane (PU) lacquer. The PU lacquer layer is caused by the residual heat of the preheated upper mold cavity to form a smooth film layer. A plastic shell of the helmet is disposed in a lower mold cavity of the molding tool. A foam material is injected into the plastic shell before the molding tool is closed. As the foaming process is completed in the molding tool, the molding tool is opened to remove therefrom a fresh safety helmet comprising the shell, the foam material, and the smooth film layer which is formed integrally with the foam material layer for providing the user of the helmet with a wearing comfort.

It must be noted here that the upper mold cavity of the molding tool must be heated again appropriately if the residual heat of the preheated upper mold cavity fails to transform the PU lacquer layer into the smooth film layer.

The method of the present invention further comprises a step in which a preformed peripheral shell of the helmet is disposed in the upper mold cavity of the molding tool before the coating of the PU lacquer is applied. Upon completion of injecting the foam material into the plastic shell disposed in the lower mold cavity of the molding tool, the molding tool is closed to bring about a foaming process. After the foaming process is concluded, the molding tool is opened to remove therefrom a fresh safety helmet having a main shell and a peripheral shell which is formed integrally with the main shell for improving the esthetic effect of the safety helmet.

The foregoing objective, features and advantages of the present invention will be more readily understood upon a thoughtful deliberation of the following detailed description of an embodiment of the present invention in conjunction with the accompanying drawings.

DETAILED DESCRIPTION OF THE INVENTION

Figure 1:
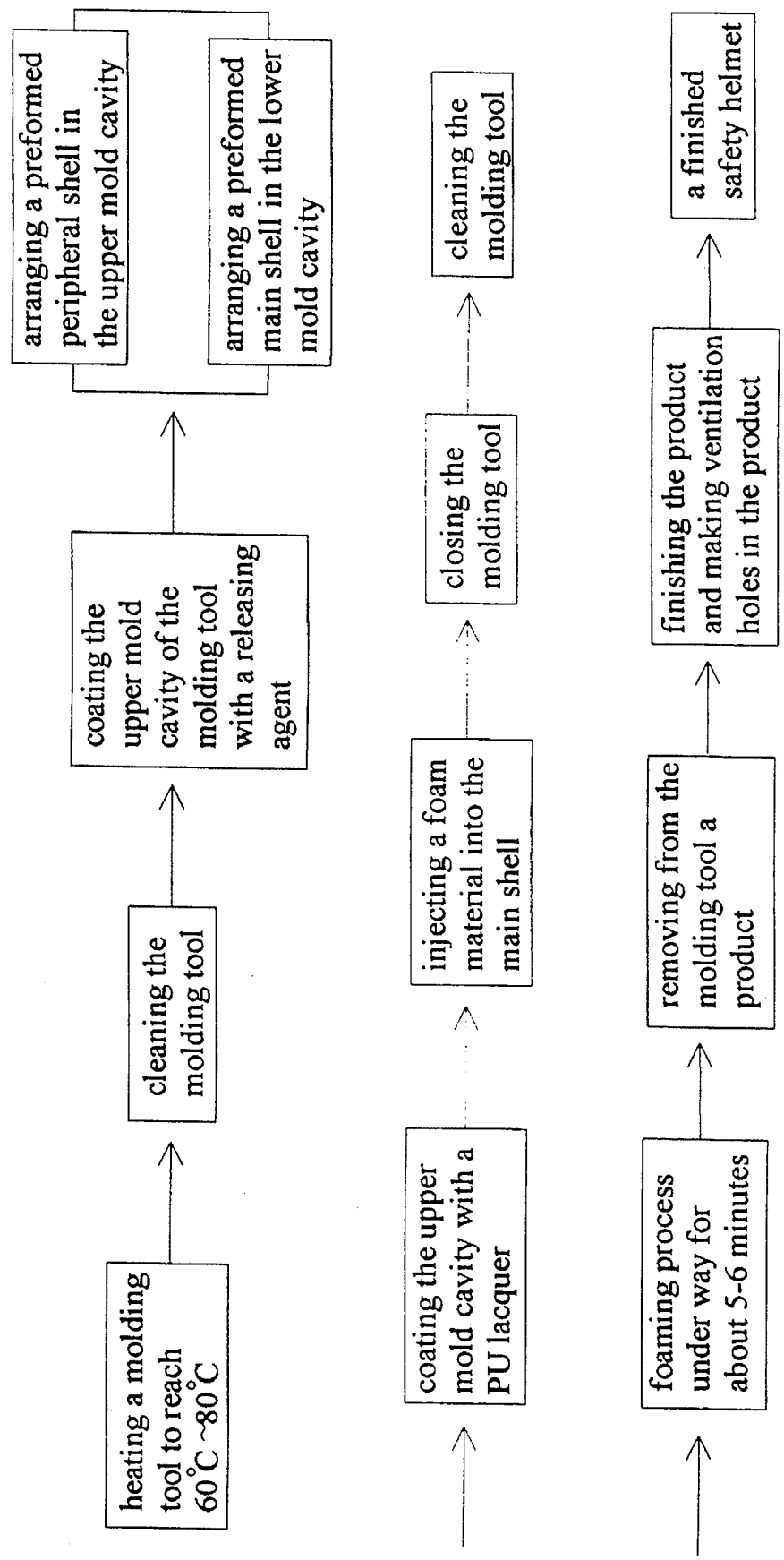
FIG.1 shows a flow diagram of the present invention.
Figure 2:
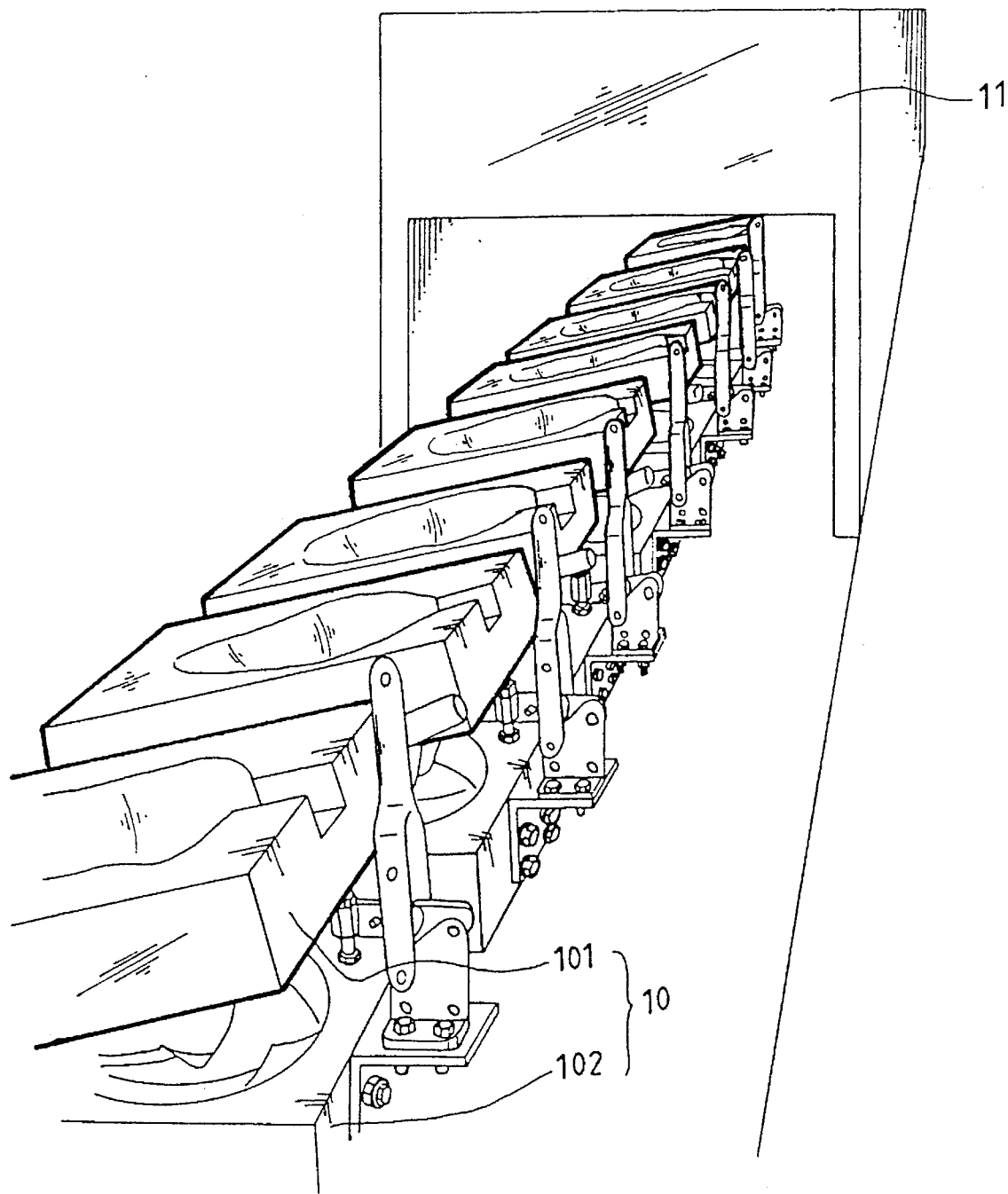
FIG.2 shows a schematic view of a first step in which a molding tool is heated according to the present invention.
Figure 3:
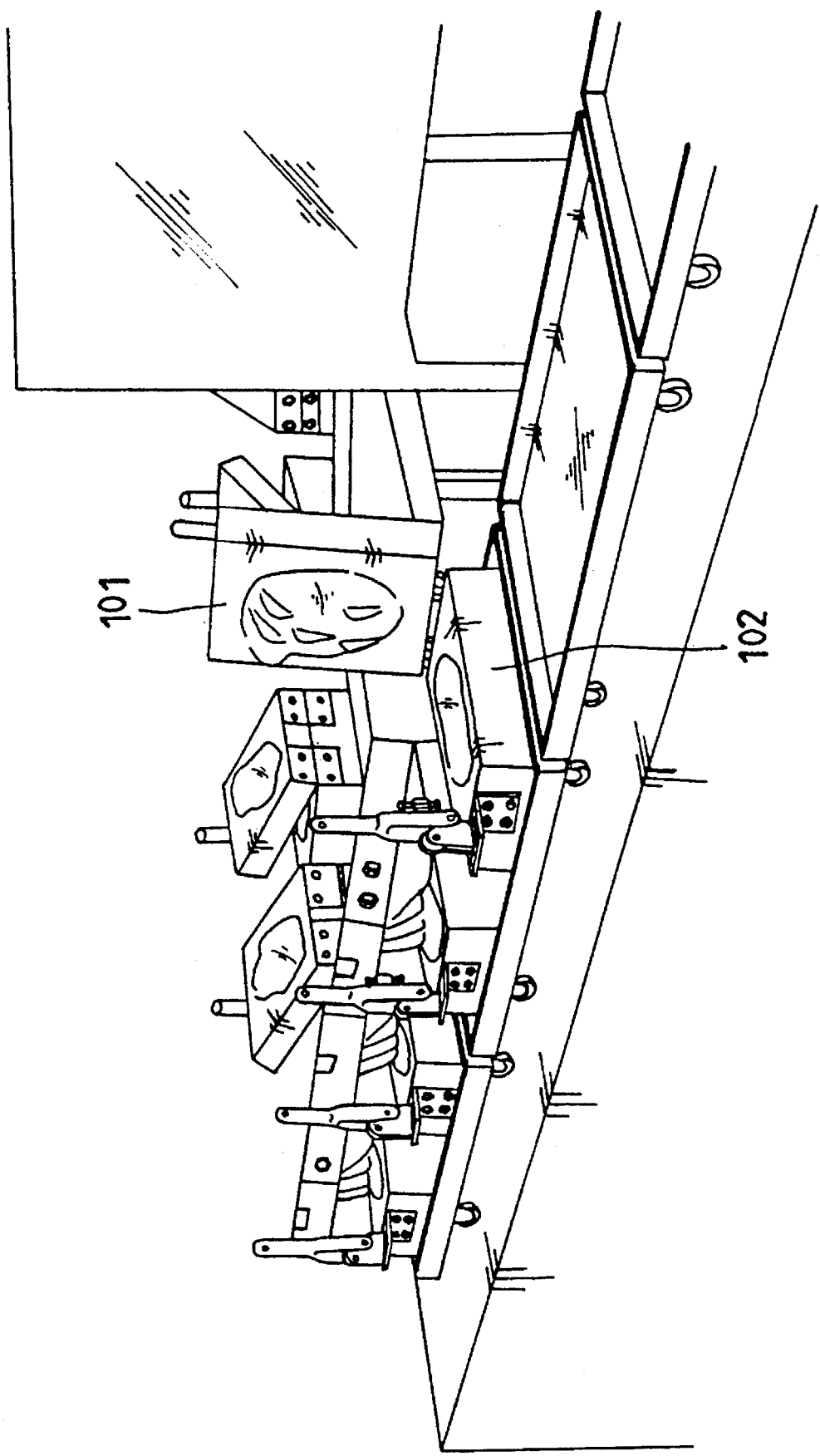
FIG. 3 shows a schematic view of a second step in which the preheated molding tool of the present invention is coated appropriately with a releasing agent.
Figure 4:
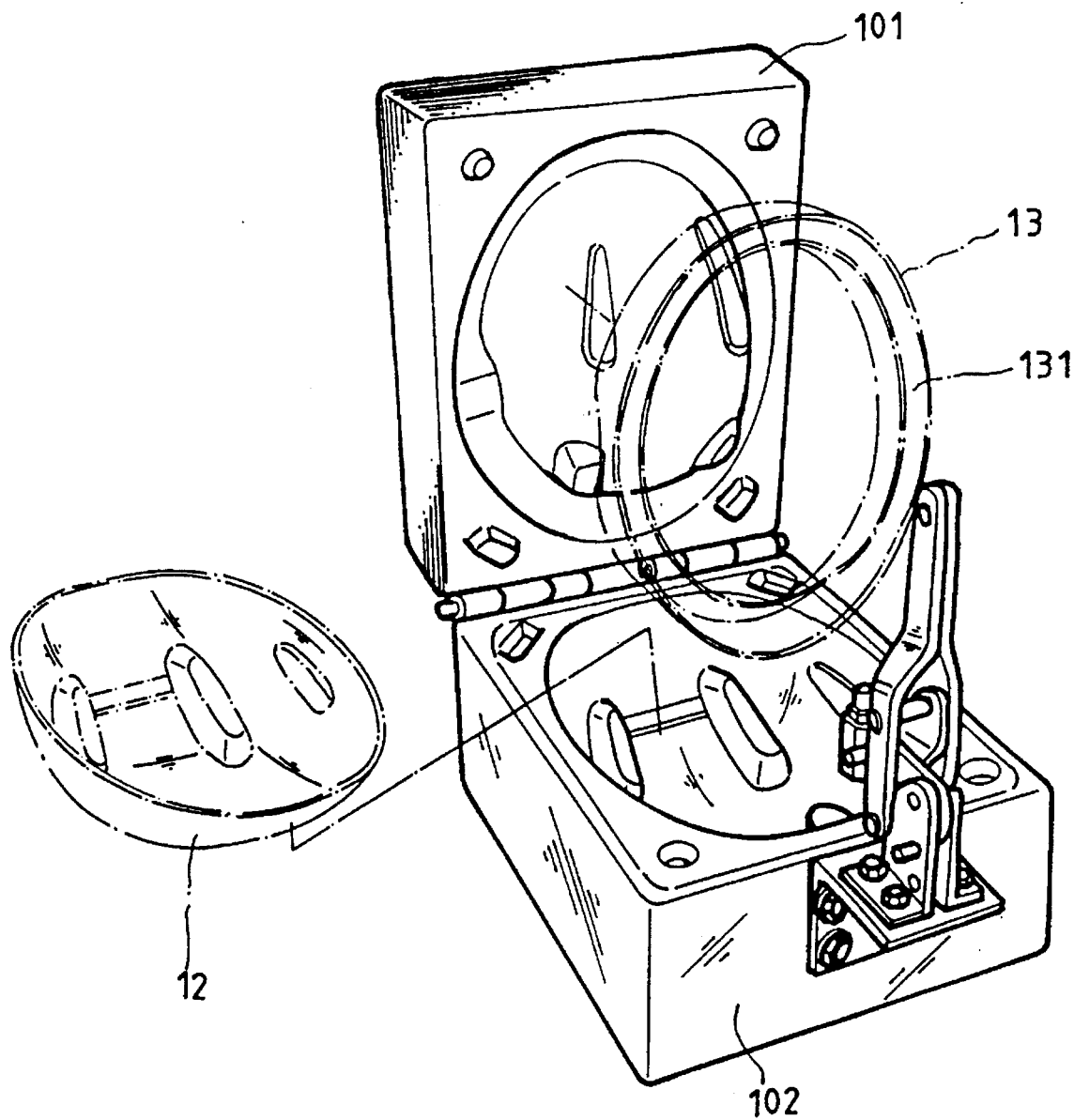
FIG.4 shows a schematic view of a third step in which a main shell of a plastic material is disposed in the molding tool of the present invention.
Figure 5:
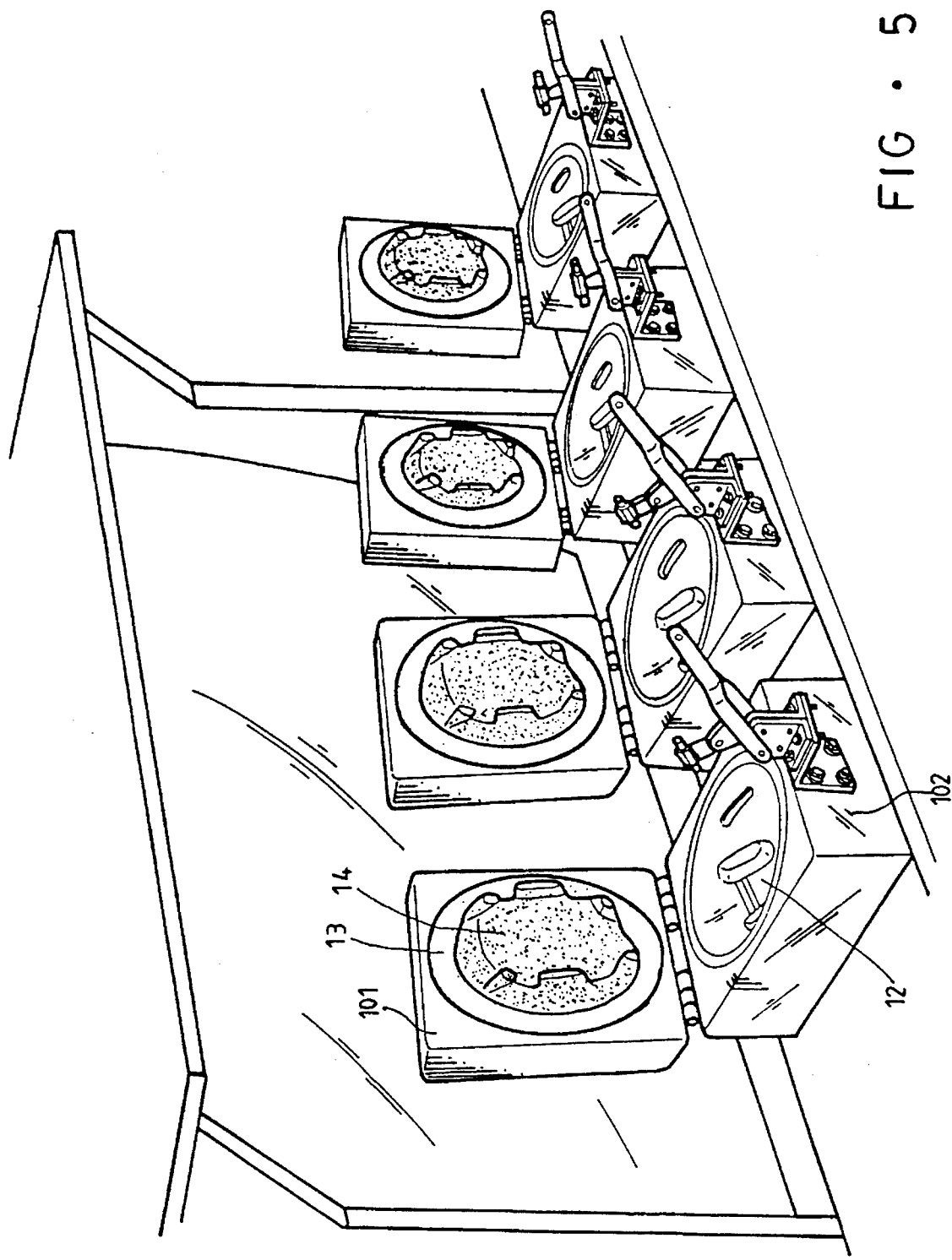
FIG.5 shows a schematic view of a fourth step in which the upper mold cavity of the molding tool of the present invention is coated with the polyurethane lacquer.
Figure 6:
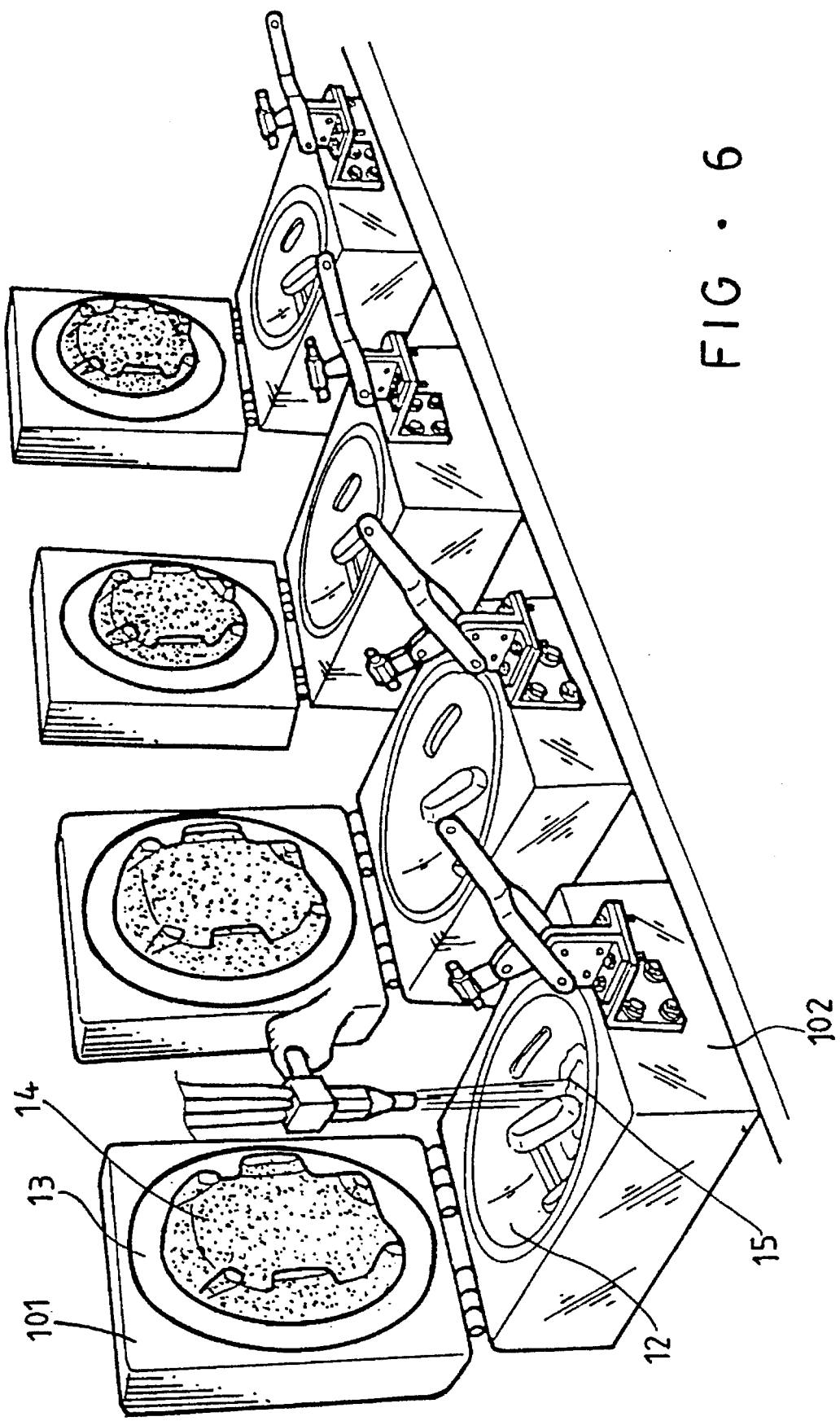
FIG.6 shows a schematic view of a fifth step in which a foam material is introduced into the main shell disposed in the lower mold cavity of the molding tool of the present invention.
Figure 7:
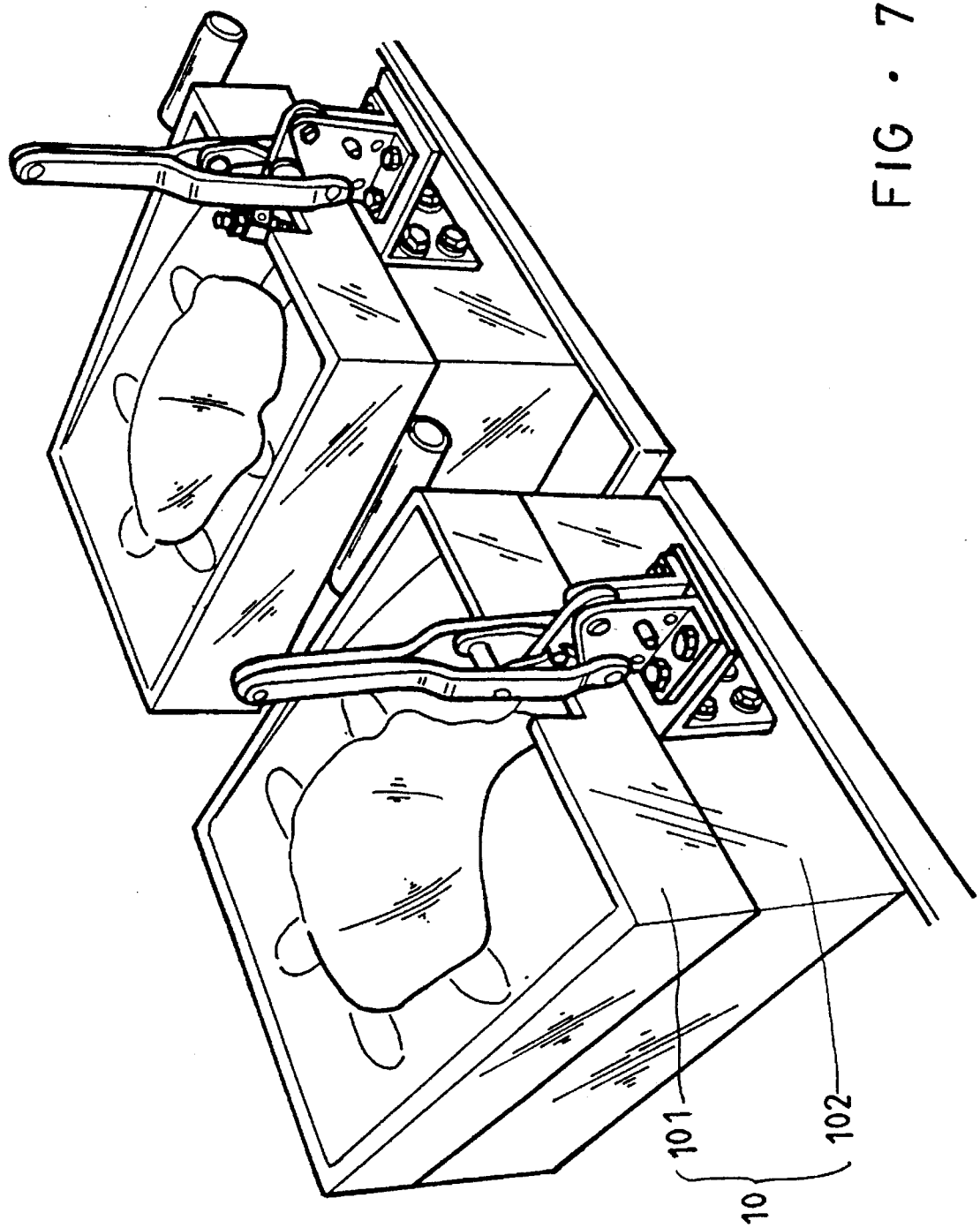
FIG.7 shows a schematic view of a sixth step in which the molding tool of the present invention is closed.
Figure 8:
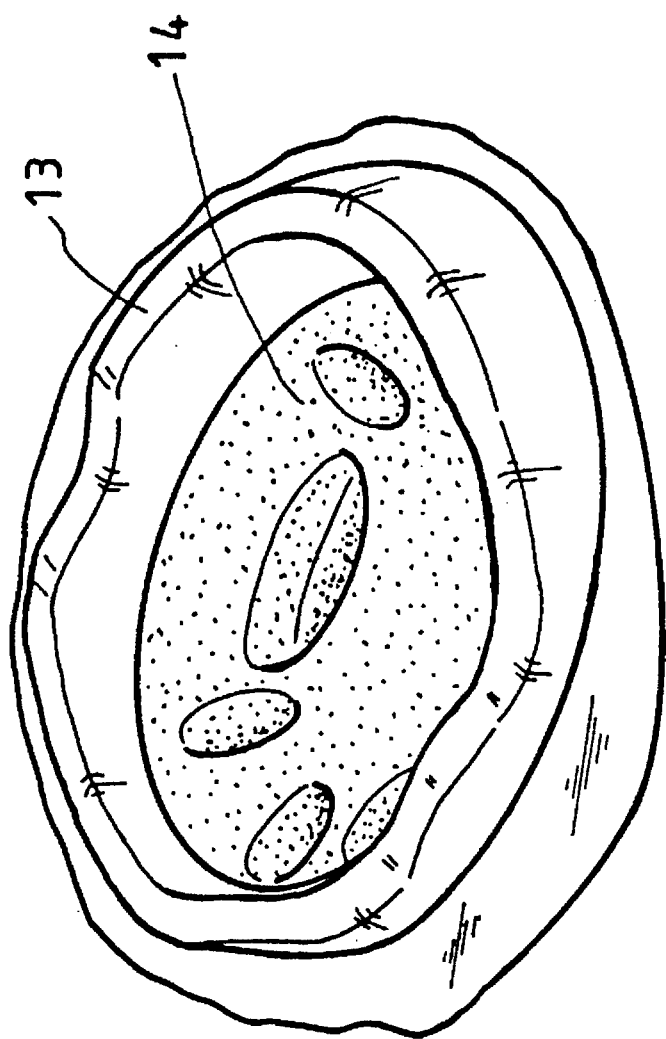
FIG.8 shows a perspective view of a semifinished safety helmet which is freshly removed from the molding tool of the present invention.
Figure 9:
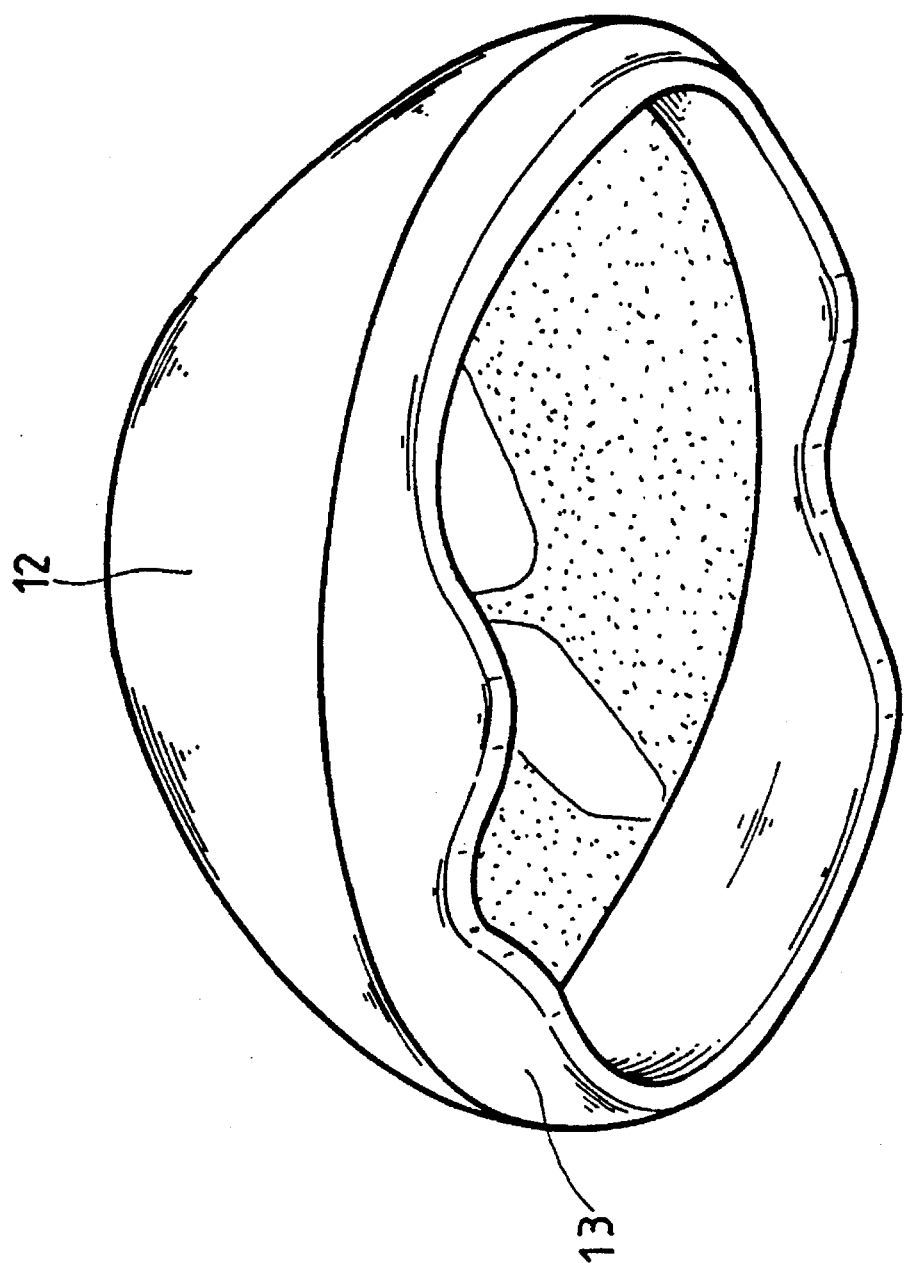
FIG.9 shows a perspective view of a final product of safety helmet of the present invention.

As illustrated in FIGS. 1 and 2, the method of the present invention makes use of a plurality of molding tools. Each molding tool 10 of the present invention comprises an upper mold cavity 101 and a lower mold cavity 102. The molding tool 10 is placed in a heating device 11 in which the molding tool 10 is heated to have a temperature ranging between 60°–80° C. It must be noted here that only the upper mold cavity 101 of the molding tool 10 is heated. As illustrated in FIGS. 1 and 3, the heated upper mold cavity 101 of the molding tool 10 is cleaned appropriately before the upper mold cavity 101 is coated with a releasing agent. As illustrated in FIG. 1 and 4, a preformed plastic main shell 12 of a safety helmet is disposed in the lower mold cavity 102 of the molding tool 10. In the meantime, a hollow peripheral shell 13 of a plastic material is arranged in the upper mold cavity 101 of the molding tool 10 such that an open end 131 of the peripheral shell 13 is opposite in location to the plastic main shell 12 located in the lower mold cavity 102 of the molding tool 10. As illustrated in FIGS. 1 and 5, the upper molding cavity 101 is coated with polyurethane (PU) lacquer, which is caused by the residual heat of the heated upper mold cavity 101 to transform into thin film layer 14. As illustrated in FIGS. 1, 6 and 7, a liquidized foam material 15 (a polyurethane compound) is introduced into the plastic main shell 12 located in the lower mold cavity 102 before the upper mold cavity 101 and the lower mold cavity 102 are joined together so as to close the molding tool 10. As the molding tool 10 is closed in an airtight manner, the foam material 15 is caused by its self-generated heat to foam in the main shell 12, thereby causing some of the foam material 15 to flow into the peripheral shell 13 via the open end 131 so as to unite the plastic main shell 12 with the plastic peripheral shell 13. Such a foaming process as described above takes about 5–6 minutes. As shown in FIG. 8, a safety helmet formed in the molding tool 10 of the present invention is composed of the plastic main shell 12 which is provided on the inner side thereof with a foam layer capable of absorbing shock. The foam layer is provided thereon with the smooth film layer 14 of the polyurethane lacquer for providing the safety helmet with a wearing comfort. A finished product of the present invention is shown schematically in FIG. 9, The safety helmet of the present invention has the peripheral shell 13 which is made integrally with the main shell 12 for improving the esthetic effect of the safety helmet and for protecting the main shell 12 from abrasion.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed:

1. A method of making a safety helmet comprising the steps of:

(a) preparing a molding tool having an upper mold cavity and a lower mold cavity;

(b) heating said upper mold cavity with a heating device until said upper mold cavity has a predetermined temperature;

(c) cleaning said upper mold cavity and said lower mold cavity;

(d) coating said upper mold cavity with a releasing agent;

(e) arranging a preformed main shell in said lower mold cavity and a preformed peripheral shell in said upper mold cavity;

(f) coating said upper mold cavity with a lacquer;

(g) injecting a foam material into said main shell located in said lower mold cavity;

(h) closing said molding tool to allow a foaming process of said foam material to take place in said molding tool; and (i) opening said molding tool to remove therefrom a safety helmet comprising said main shell and said peripheral shell attached integrally to said main shell which is provided on an inner side thereof with a foam layer formed of said Foam material, said foam layer having thereon a smooth film formed of said lacquer.

2. The method as defined in claim 1, wherein said temperature of said upper mold cavity ranges between 60° C. and 80° C.

3. The method as defined in claim 1, where in said main shell is made of a plastic material having a predetermined rigidity.

4. The method as defined in claim 1, wherein said peripheral shell is made of a plastic material having a predetermined rigidity.

5. The method as defined in claim 1, wherein said lacquer is a polyurethane lacquer.

6. The method as defined in claim 1, wherein said foaming process is brought about by a self-generated heat of said foam material.

7. The method as defined in claim 6, wherein said foam material is a polyurethane compound.

* * * * *